No. 721,428. PATENTED FEB. 24, 1903.
M. CORRINGTON.
AUTOMATIC FLUID PRESSURE BRAKE APPARATUS.
APPLICATION FILED DEC. 21, 1901.
NO MODEL.
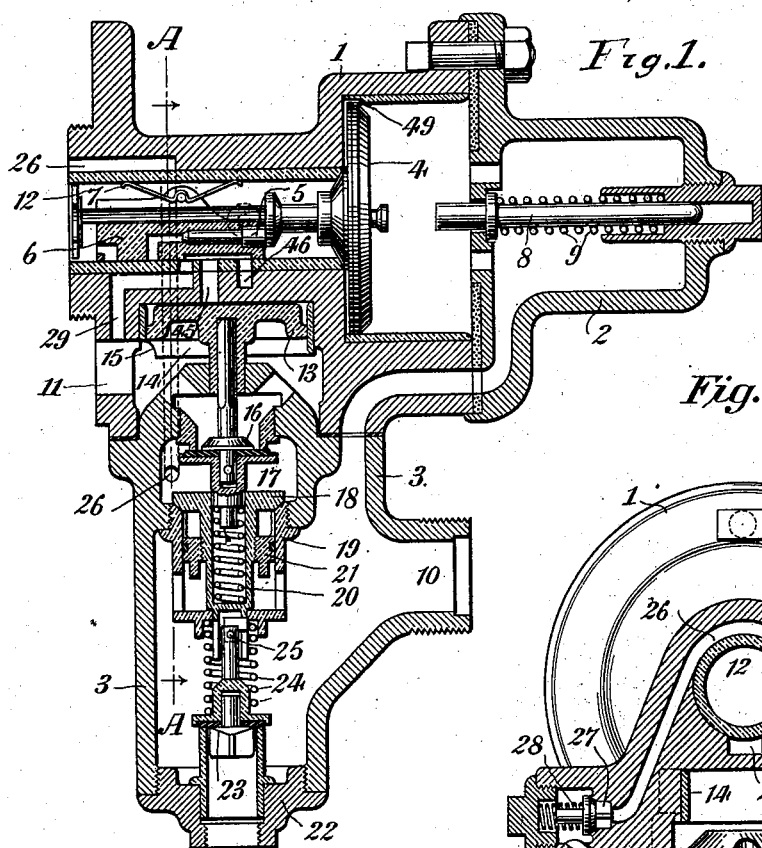
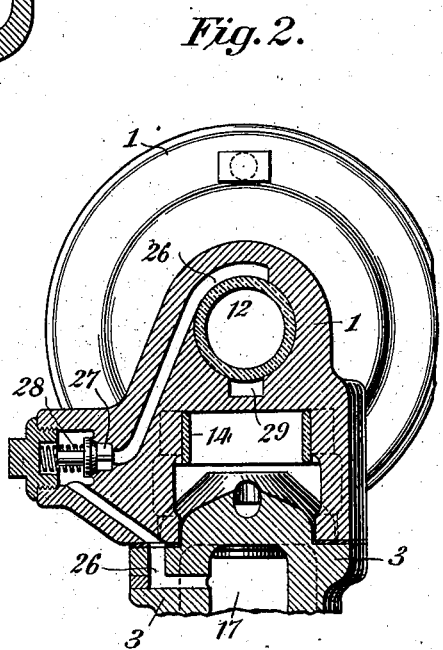
WITNESSES:
C. E. Ashley
Mau. Spillane
INVENTOR
Murray Corrington

UNITED STATES PATENT OFFICE.

MURRAY CORRINGTON, OF NEW YORK, N. Y.

AUTOMATIC FLUID-PRESSURE BRAKE APPARATUS.

SPECIFICATION forming part of Letters Patent No. 721,428, dated February 24, 1903.

Application filed December 21, 1901. Serial No. 86,769. (No model.)

*To all whom it may concern:*

Be it known that I, MURRAY CORRINGTON, a citizen of the United States, residing at New York city, in the county and State of New York, have invented certain new and useful Improvements in Automatic Fluid-Pressure Brake Apparatus, of which the following is a specification.

My invention relates to improvements in valve mechanism forming part of an automatic fluid-pressure brake system for controlling the admission of compressed air to and its exhaust from a brake-cylinder, as will be fully pointed out in the accompanying description and claim.

Referring to the drawings, Figure 1 is a vertical section of a quick-action triple-valve mechanism, and Fig. 2 is a section of a portion of the triple-valve casing of Fig. 1 on the line A A of Fig. 1 looking toward the right.

The triple-valve casing is made up of the three sections 1, 2, and 3, which are united together in the usual manner. The piston 4, the graduating-valve 5, the main slide-valve 6, the spring 7, the graduating-stop 8, and the graduating-spring 9 form the usual parts of a triple-valve device. The passages 10, 11, and 12 connect with the train-pipe, the brake-cylinder, and the auxiliary reservoir, respectively, in the usual manner. In a chamber below the triple valve is a piston 13, operating within a bushing 14 and controlling the opening movement of the valve 16 in a chamber 17. The check-valve 18 is placed in the box or holder 19, while the spring 20 normally holds both valves 16 and 18 upon their seats. A piston 21, which preferably has a packing-ring, as illustrated, is attached to the stem of the valve 18. A cap 22 closes the lower end of the casing 3 and has a port through it controlled by a valve 23, which is normally seated by the spring 24 and is coupled to the stem of the check-valve 18 by means of the pin 25. The ports 29, 45, and 46 lead, respectively, to the brake-cylinder, the piston 13, and exhaust. A passage 26, having a check-valve 27, seated by a spring 28, Fig. 2, may, if desired, be inserted in the construction between the auxiliary reservoir and the chamber 17.

When air is charged into the system, it goes past the piston 4 through the usual charging-groove 49, charging the auxiliary reservoir in the usual manner, and goes thence by passage 26 to the chamber 17. When it is desired to set the brakes, the train-pipe pressure is lowered gradually, which moves the triple valve back against the graduating-stop and admits air from reservoir to brake-cylinder past the graduating-valve in the usual manner. When the extraordinary reduction of train-pipe pressure is made for emergency application, the triple valve moves through its full traverse to the right, which admits pressure from the auxiliary reservoir through the port 45 in the well-known manner, moving the piston 13 downward and opening the valve 16. This vents the pressure in the small chamber 17 past the valve 16, whereupon the pressure below the piston 21 lifts it up and pulls the valve 23 off its seat, thus venting the air from the train-pipe directly to the atmosphere. The brakes are released in the usual manner by increasing the train-pipe pressure and driving the triple valve back to the normal position, as shown. If it is desired to vent the train-pipe air into the brake-cylinder, this can be readily done by removing the piston 21, the valve 23, and spring 24 and plugging up the port in the cap 22. It is apparent that, passage 26 being inserted in the construction, when the valve 16 is opened not only is there such a reduction of pressure above the piston 21 as to permit that piston to rise and open the vent-valve 23, but, the passage 26 remaining open, air continues to flow through said passage and past the valve 16 to the brake-cylinder in addition to the ordinary provisions for admitting reservoir-pressure to the cylinder while the triple valve is in emergency position. Ordinarily when the triple valve occupies emergency position reservoir-pressure flows to the cylinder through the passage 29 and also through the passage 45 around the piston 13. In all triple valves of the general character illustrated a notch is made in the bushing 14, such as 15, on the side next to the brake-cylinder passage 11, so as to permit a ready flow of air to the cylinder. By dropping the outer edge or rim of the piston 13 a little below the central portion, as illustrated in Fig. 1, when the piston is moved down by the admission of reservoir-pressure through the passage 45 the rim of the piston passes below and uncovers a portion of the notch or port 15 in the bush, thus allowing the air to flow past the piston rapidly from the reservoir to the brake-cylinder. Either or both of these means for admitting reservoir-pressure rapidly to the cylinder may be employed. In case passage 26 is omitted from the construction or is permanently closed air in charging leaks past the piston 21 to charge the chamber 17; but said chamber remains at all times cut off from the train-pipe.

I claim—

In an automatic fluid-pressure brake system, the combination, in a valve device adapted for operation with a triple valve, of a vent-valve controlling a passage from train-pipe to atmosphere, a normally balanced piston controlling said valve, a valve for venting pressure from one side of said piston, a second piston actuated by the admission of auxiliary reservoir-pressure to open said valve and extraordinary means substantially as described for admitting pressure from auxiliary reservoir to brake-cylinder while the triple valve is in emergency position.

MURRAY CORRINGTON.

Witnesses:
MAURICE SPILLANE,
JOHN J. DONAGHY, Jr.